US009666136B2

(12) United States Patent
Xu

(10) Patent No.: US 9,666,136 B2
(45) Date of Patent: May 30, 2017

(54) ARRAY SUBSTRATE FOR DISCHARGING RAPIDLY CHARGES STORED IN THE PIXEL UNITS WHEN DISPLAY DEVICE IS POWERED OFF AND DRIVING METHOD THEREOF AND DISPLAY DEVICE

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventor: Xiangyang Xu, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 43 days.

(21) Appl. No.: 14/370,534

(22) PCT Filed: Oct. 15, 2013

(86) PCT No.: PCT/CN2013/085228
§ 371 (c)(1),
(2) Date: Jul. 3, 2014

(87) PCT Pub. No.: WO2015/010374
PCT Pub. Date: Jan. 29, 2015

(65) Prior Publication Data

US 2015/0206477 A1 Jul. 23, 2015

(30) Foreign Application Priority Data

Jul. 25, 2013 (CN) .......................... 2013 1 0317675

(51) Int. Cl.
*G09G 5/00* (2006.01)
*G06F 3/038* (2013.01)
(Continued)

(52) U.S. Cl.
CPC ......... *G09G 3/3266* (2013.01); *G09G 3/3233* (2013.01); *G09G 2300/0426* (2013.01);
(Continued)

(58) Field of Classification Search
CPC ..................................................... G09G 3/3266
(Continued)

(56) References Cited

U.S. PATENT DOCUMENTS

2006/0012549 A1* 1/2006 Ikeda .................... G09G 3/3233 345/76
2006/0132056 A1* 6/2006 Kim ...................... G09G 3/3216 315/169.3
(Continued)

FOREIGN PATENT DOCUMENTS

CN 102222474 A 10/2011
CN 102867491 A 1/2013
(Continued)

OTHER PUBLICATIONS

First Chinese Office Action Appln. No. 201310317675.4; Dated Dec. 23, 2014.
(Continued)

*Primary Examiner* — Long D Pham
(74) *Attorney, Agent, or Firm* — Ladas & Parry LLP

(57) ABSTRACT

An array substrate includes: a scanning driving unit for providing a row scanning signal to a plurality of gate lines, and a data driving unit for providing a data signal to a plurality of data lines, the plurality of gate lines and the plurality of data lines being horizontally and vertically crossed to form an array of pixel units arranged in an matrix
(Continued)

form, and further including: a control unit electrically connected with the scanning driving unit and the data driving unit respectively, for controlling the scanning driving unit turn on each of the pixel units when the display device is powered off, such that charges stored in the pixel units are rapidly discharged through the data lines, so as to eliminate the shutdown image sticking of the AMOLED display. There have disclosed also a method for driving array substrate and a display device.

12 Claims, 3 Drawing Sheets

(51) Int. Cl.

*G09G 3/3266* (2016.01)

*G09G 3/3233* (2016.01)

(52) U.S. Cl.

CPC ............... *G09G 2310/0245* (2013.01); *G09G 2320/0257* (2013.01); *G09G 2330/027* (2013.01)

(58) Field of Classification Search

USPC .................................................... 345/211, 76

See application file for complete search history.

(56) References Cited

U.S. PATENT DOCUMENTS

| | | | | |
|---|---|---|---|---|
| 2007/0118781 | A1* | 5/2007 | Kim ..................... | G09G 3/3233 714/727 |
| 2007/0279363 | A1* | 12/2007 | Maeng ................. | G09G 3/3648 345/100 |
| 2008/0123012 | A1* | 5/2008 | Ohtomo ................ | G02F 1/1368 349/54 |
| 2011/0254825 | A1 | 10/2011 | Peng et al. | |
| 2011/0292005 | A1* | 12/2011 | Lau ...................... | G09G 3/3677 345/204 |

FOREIGN PATENT DOCUMENTS

| | | | |
|---|---|---|---|
| CN | 103117040 | A | 5/2013 |
| CN | 203366703 | U | 12/2013 |

OTHER PUBLICATIONS

International Search Report Appln. No. PCT/CN2013/086228; Dated Apr. 18, 2014.

International Preliminary Report on Patentability issued Jan. 26, 2016; PCT/CN2013/085228.

* cited by examiner

ARRAY SUBSTRATE FOR DISCHARGING RAPIDLY CHARGES STORED IN THE PIXEL UNITS WHEN DISPLAY DEVICE IS POWERED OFF AND DRIVING METHOD THEREOF AND DISPLAY DEVICE

TECHNICAL FIELD

The present disclosure relates to the field of display technique, specifically to an array substrate, a driving method thereof and a display device.

BACKGROUND

A principle of lighting emitting for an organic light emitting diode OLED display is as follows: by applying certain electric fields to an anode and a cathode at two sides of an electroluminescent layer, being driven by the electric fields, electrons and holes are transferred to a light emitting layer from the anode and the cathode via an electron transport layer and a hole transmission layer respectively and encounter with each other at the light emitting layer, so as to form excitons and excite luminescence molecules. Then, the luminescence molecules emit visible lights through radiative relaxation. Compared with a transitional liquid crystal display LCD, the OLED display is increasingly applied to a field of high-performance display due to its characteristics of self-luminescent, quick response, wide viewing angle and being able to be made on a flexible substrate and so on.

The OLED can be categorized into a passive matrix driving organic light emitting diode PMOLED and an active matrix driving organic light emitting diode AMOLED according to driving modes. The traditional PMOLED generally needs to reduce driving time for an individual pixel as a size of a display device increases, and thus a transient current is needed to be increased, thereby causing a great rise of power consumption. On the contrary, in the AMOLED technique, each OLED progressively scans input current through a thin film transistor TFT switching circuit, which can solve these problems well.

However, since the AMOLED is an active driving mode, there may be charges left on a pixel capacitor at the moment of the shutdown. These charges will cause pixels, at the moment of the shutdown, to be kept at a voltage before the shutdown, so that there are residual images on the panel, thereby forming the so-called shutdown image sticking.

SUMMARY

Embodiments of the present disclosure provide an array substrate, a driving method thereof and a display device, which are used for eliminating shutdown image sticking of an AMOLED display.

In order to solve technical problems existing in the above prior art, the embodiments of the present disclosure adopt the following technical solutions:

According to one aspect of the embodiments of the present disclosure, there is provided an array substrate, comprising: a scanning driving unit for providing a row scanning signal to a plurality of gate lines, and a data driving unit for providing a data signal to a plurality of data lines, the plurality of gate lines and the plurality of data lines being horizontally and vertically crossed with each other to form an array of pixel units arranged in an matrix form, and further comprising:

a control unit electrically connected with the scanning driving unit and the data driving unit respectively for controlling the scanning driving unit to turn on each of the pixel units when the display device is powered off, thereby charges stored in the pixel units being rapidly discharged through the data lines, wherein the control unit comprises: a control signal line for receiving an output signal of a timer, a first transistor and a second transistor;

a gate of the first transistor is connected to the control signal line, a first electrode thereof is connected to the power line, and a second electrode thereof is connected to a ground;

a gate of the second transistor is connected to the control signal line, a first electrode thereof is connected to the data signal line, and a second electrode thereof is connected to a ground.

According to another aspect of the embodiments of the present disclosure, there is provided a display device comprising the array substrate described above.

According to another aspect of the embodiment of the present disclosure, there is provided a method for driving an array substrate, comprising:

providing a row scanning signal to a plurality of gate lines by a scanning driving unit and providing a data signal to a plurality of scanned data lines by a data driving unit when a display device is powered on, the plurality of gate lines and the plurality of data lines being horizontally and vertically crossed with each other to form an array of pixel units arranged in a matrix form;

controlling the scanning driving unit to turn on each of the pixel units by a control unit when the display device is powered off, such that charges stored in the pixel units are rapidly discharged through the data lines.

The array substrate, the driving method thereof and the display device provided in the embodiments of the present disclosure add a control unit on the basis of the existing array substrate design. This control unit is electrically connected with the scanning driving unit and the data driving unit respectively for controlling the scanning driving unit to turn on each of the pixel units when the display device is powered off, so that charges stored in the pixel units can be rapidly discharged through the data lines. In this way, image sticking produced due to the existence of charges in the pixels is avoided at the moment after the shutdown of the display device, thereby effectively eliminating the shutdown image sticking of the AMOLED display and improving the display quality of the display device.

BRIEF DESCRIPTION OF THE DRAWINGS

In order to more clearly specify technical solutions in the embodiments of the present disclosure or the prior art, the accompanying drawings needed to be used in the descriptions of the embodiments or the prior art will be simply introduced below. Obviously, the accompanying drawings in the following descriptions are just some of the embodiments of the present disclosure. For those ordinary skilled in the art, other drawings can also be obtained according to these accompanying drawings without paying any inventive labor.

DETAILED DESCRIPTION

The technical solutions in the embodiments of the present disclosure will be clearly and completely described below in combination with the accompanying drawings. Obviously, the embodiments described are just a part of embodiments of the present disclosure rather than all the embodiments. Based on the embodiments of the present disclosure, all the other embodiments obtained by those ordinary skilled in the art without paying any inventive labor belong to the scope sought for protection in the present disclosure.

Figure 1:
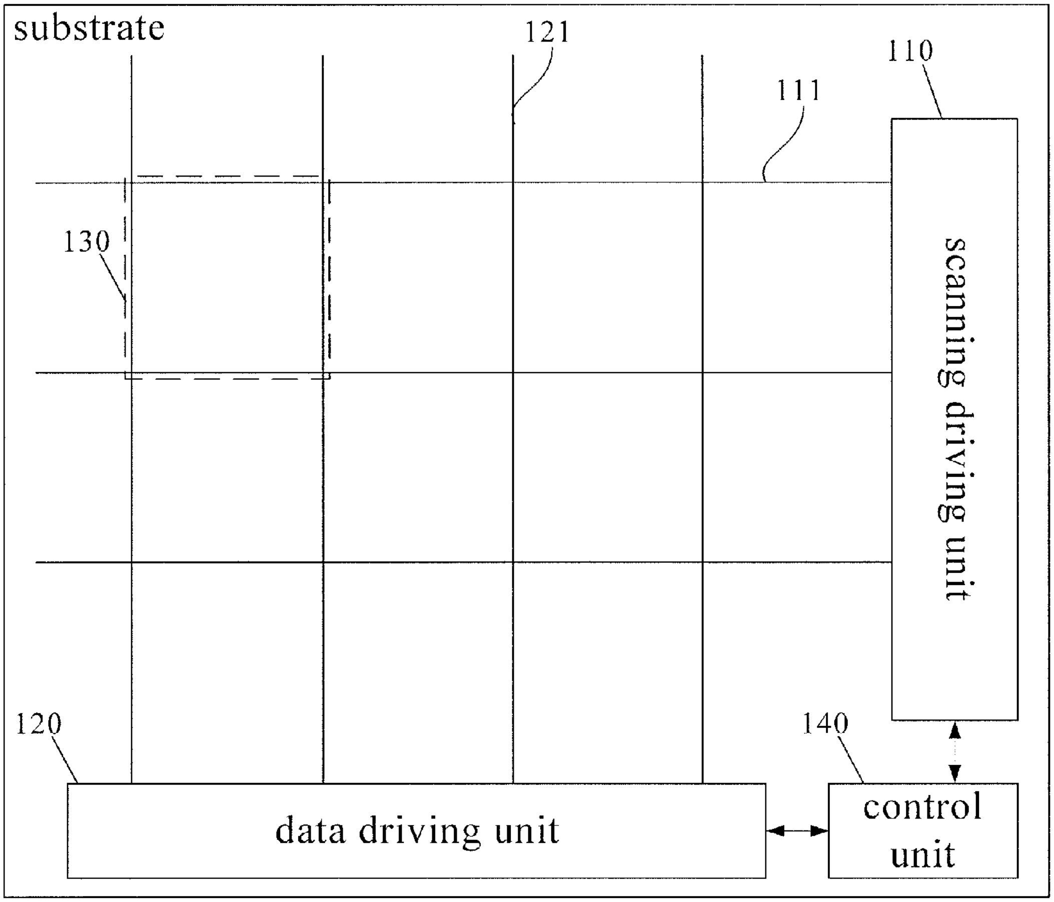
FIG. 1 is a schematic diagram of a structure of an array substrate according to an embodiment of the present disclosure.

As shown in FIG. 1, an array substrate according to an embodiment of the present disclosure comprises: a scanning driving unit 110 for providing a row scanning signal to a plurality of gate lines 111, and a data driving unit 120 for providing a data signal to a plurality of data lines, the plurality of gate lines 111 and the plurality of data lines 121 being horizontally and vertically crossed with each other to form an array of pixel units 130 arranged in an matrix form. The array substrate further comprises:

a control unit 140 electrically connected with the scanning driving unit 110 and the data driving unit 120 respectively, for controlling the scanning driving unit 110 to turn on each of the pixel units 130 when the display device is powered off, such that charges stored in the pixel units 130 is rapidly discharged through the data lines 121.

The array substrate provided in the embodiment of the present disclosure adds a control unit on the basis of the existing array substrate design. This control unit is electrically connected with the scanning driving unit and the data driving unit respectively and used for controlling the scanning driving unit to turn on each of the pixel units when the display device is powered off, so that charges stored in the pixel units can be rapidly discharged through the data lines. In this way, image sticking produced due to the existence of charges in the pixels is avoided at the moment after the shutdown of the display device, thereby effectively eliminating the shutdown image sticking of the AMOLED display and improving display quality of the display device.

Figure 2:
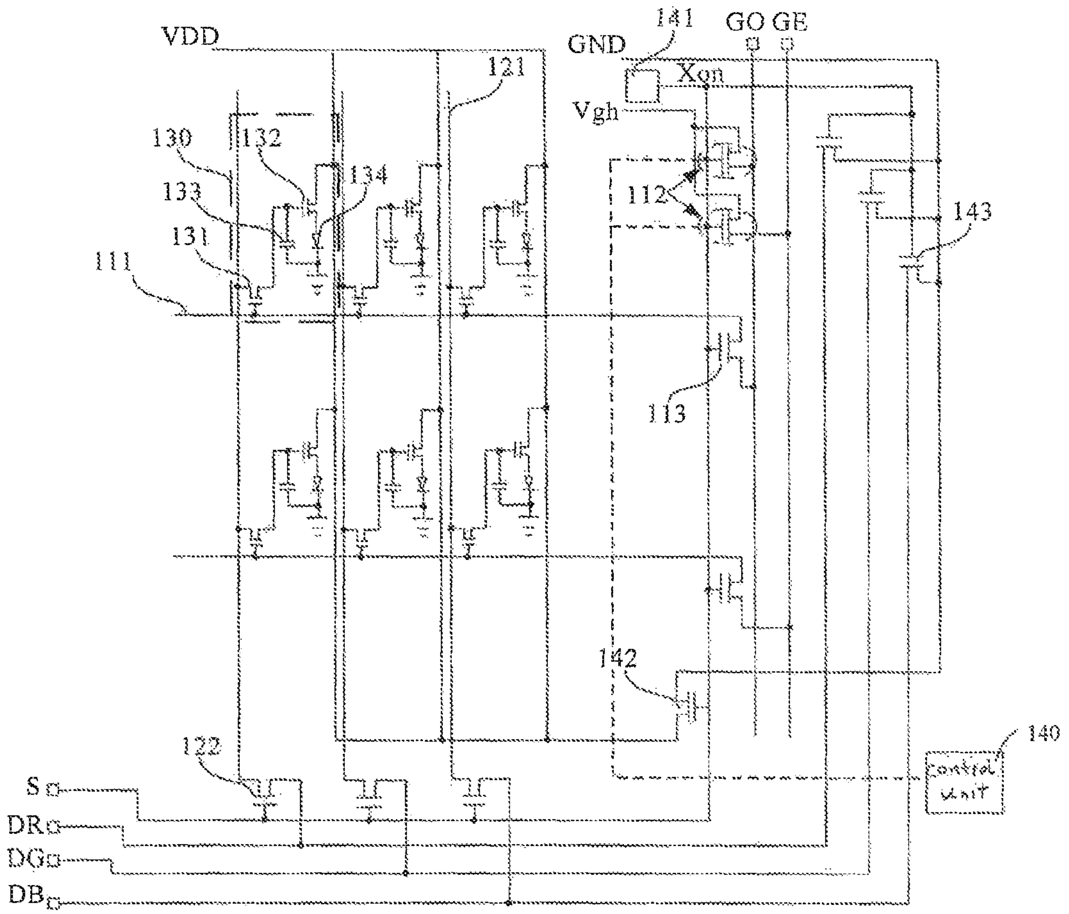
FIG. 2 is a schematic diagram of a circuit connecting structure of an array substrate according to an embodiment of the present disclosure.

Further, as shown in FIG. 2, the array substrate can further comprise a power line VDD for supplying power to the inside of the pixel units 130.

The control unit 140 can be further used for connecting the power line VDD to a ground when the display device is powered off.

Specifically, in the embodiment of the present disclosure, the display device can adopt various kinds of OLED displays. Since the OLED device is an active device, it is always needed to additionally set a power line VDD for supplying power to the active OLED device. When the display device is powered off, it is always difficult for this power line VDD to be turned off in time, which also causes charges to exist in the pixel units, thereby producing the shutdown image sticking. The design adopting such kind of control unit 140 can rapidly connect the power line VDD to the ground when the display device is powered off, so as to further avoid the charges from being left in the pixel units and further improve the display quality of the display device.

Further, as shown in FIG. 2, the pixel unit 130 can specifically comprise: a first transistor 131, a second transistor 132, a storage capacitor 133 and a light emitting device 134.

A gate of the first transistor 131 is connected to a gate line 111, a first electrode thereof is connected to a gate of the second transistor 132, and a second electrode thereof is connected to the data lines 121.

A first electrode of the second transistor 132 is connected to a positive electrode of the light emitting device 134, and a second electrode thereof is connected to the power line VDD.

One terminal of the storage capacitor 133 is connected to the gate of the second transistor 132, and the other terminal thereof is connected to a negative electrode of the light emitting device 134.

The negative electrode of the light emitting device 134 is further connected to a common electrode or the ground.

It is needed to specify that transistors adopted in all the embodiments of the present disclosure can be thin film transistors or field effect transistors or other devices with the same characteristics. Since drains and sources of the transistors adopted herein are symmetrical, the sources and drains make no difference. In the embodiments of the present disclosure, in order to differentiate the two electrodes apart from the gate of the transistor, one of the two electrodes is referred to as a source and the other one of the two electrodes is referred to as a drain. In addition, the transistors can be categorized into N type transistors or P type transistors according to the characteristics of the transistors. In the embodiments of the present disclosure, when an N type transistor is adopted, its first electrode can be a source and second electrode can be a drain; when a P type transistor is adopted, its first electrode can be a drain and second electrode can be a source. In the AMOLED pixel circuit of the embodiments of the present disclosure, all the transistors are specified by taking N type transistors as an example. It can be considered that adopting P type transistors to implement the present disclosure is easily conceivable for those skilled in the art without paying any inventive labor, and thus it also falls into the protection scope of the embodiments of the present disclosure.

Further, as shown in FIG. 2, the scanning driving unit 110 can comprise: a first scanning signal line GO, a second scanning signal line GE, a voltage line Vgh, two third transistors 112 corresponding to the first scanning signal line GO and the second scanning signal line GE respectively and a plurality of fourth transistors 113.

A gate of the third transistor 112 is connected to the control unit 140, a first electrode thereof is connected to the scanning signal line and a second electrode thereof is connected to the voltage line Vgh.

A gate of the fourth transistor 113 is connected to the control unit 140, a first electrode thereof is connected to a gate line 111 and a second electrode thereof is connected to a scanning signal line.

Herein, the first scanning signal line GO is used for providing line by line a row scanning signal to an odd row of gate lines 111 through the fourth transistor 113.

The second scanning signal line GE is used for providing line by line a row scanning signal to an even row of gate lines 111 through the fourth transistor 113.

The use of a scanning driving unit circuit design with such structure can prevent crosstalk between rows from being produced due to an input of the same signal to the adjacent two rows by inputting every other line the row driving signal, so that the row space between the two adjacent rows of the pixel units is further narrowed, thereby greatly enhancing resolution and display quality of the display device.

Further, also referring to FIG. 2, the data driving unit 120 can comprise: a plurality of data signal lines DR, DG and DB, a switch signal line S and a plurality of fifth transistors 122 corresponding to the data signal lines.

A gate of the fifth transistor 122 is connected to the switch signal line S, a first electrode thereof is connected to a data line 121, and a second electrode thereof is connected to one of the plurality of the data signal lines DR, DG and DB.

Each of the data signal lines is used for inputting a data signal of one color.

Specifically, in the embodiment of the present disclosure, it is illustrated by taking the data signal lines including three data signal lines of a red data signal line DR, a green data signal line DG and a blue data signal line DB as an example. Herein, each of the data signal lines corresponds to a column of pixel units, and every three columns of pixel units respectively display three colors of red, green and blue, so as to realize a colored display.

Further, the control unit 140 can further comprise: a control signal line Xon for receiving an output signal of a timer 141, a sixth transistor 142 and a seventh transistor 143.

A gate of the sixth transistor 142 is connected to the control signal line Xon, a first electrode thereof is connected to the power line VDD, and a second electrode thereof is connected to the ground GND.

A gate of the seventh transistor 143 is connected to the control signal line Xon, a first electrode thereof is connected to a data signal line, and a second electrode thereof is connected to the ground.

Specifically, the timer 141 can be implemented by adopting all electronic elements and devices or circuit structures including a timer control register Tcon, which have the timing trigger function. By taking all the transistors being N type transistors as an example, when the display device is shut down, a high level pulse signal can be synchronously produced by the Tcon to be inputted to the control signal line Xon. This pulse signal momentarily turns on all the gate driving signals, such that each of the pixel units is in a turn-on state; at the same time, the data line signal is pulled down to discharge charges in the pixel capacitor, and in the meanwhile, the OLED power line supplying power is connected to the ground, so that the driving transistor of the OLED is in a turn-off state, and then the OLED is turned off, so as to eliminate the shutdown image sticking phenomenon.

Figure 3:
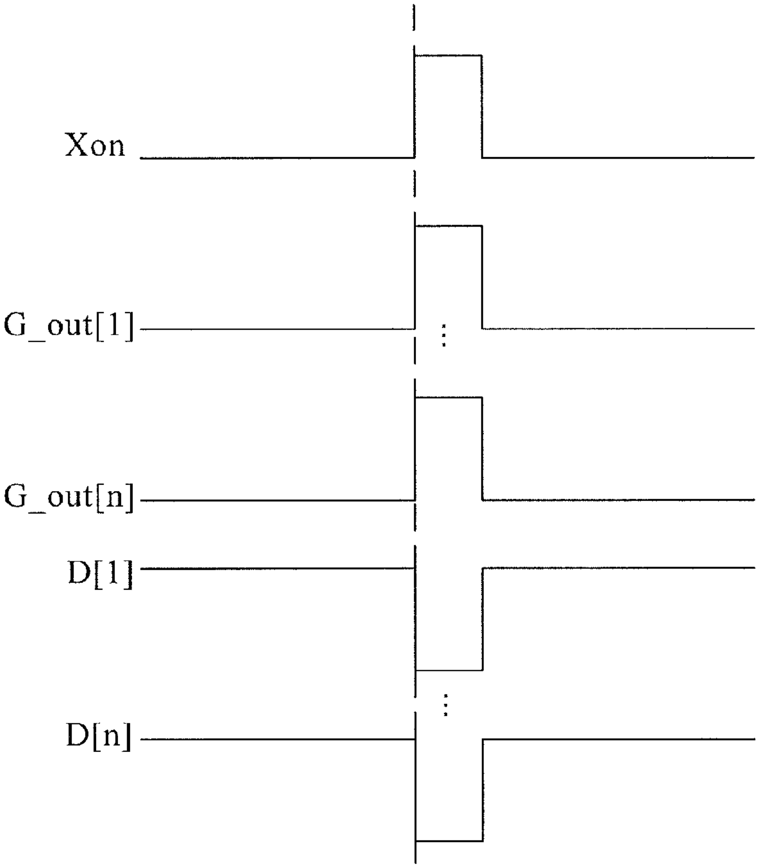
FIG. 3 is a graph of signal waveform of an array substrate when a display device is powered off according to an embodiment of the present disclosure.

Specifically, when the display device is shut down as shown in FIG. 3. At the moment of the shutdown, the Xon signal produced by the Txon is at a high level to turn on all the gate lines simultaneously, and at this time, each of the gate lines G_out is at the high level; the switches of the data lines are also turned on, and at this time, the data signal line D is at a low level, and all pixel capacitors discharge the residual charges through the data lines. At the same time, the switch of the VDD signal is also turned on, and the residual charges in the panel is momentarily discharged through the VDD signal line, so as to realize eliminating the image sticking.

The display device of the embodiment of the present disclosure comprises an organic light emitting display and other displays and the like. The display device comprises any one of the array substrates described above.

Specifically, the display device of the embodiments of the present disclosure can be a display device including a LED display or an OLED display and having a current driving light emitting device.

The display device of the embodiments of the present disclosure includes an array substrate, which adds a control unit on the basis of the existing array substrate design. This control unit is electrically connected with the scanning driving unit and the data driving unit respectively and used for controlling the scanning driving unit to turn on each of the pixel units when the display device is powered off, so that charges stored in the pixel units can be rapidly discharged through the data lines. In this way, image sticking produced due to the existence of charges in the pixels is avoided at the moment after the shutdown of the display device, thereby effectively eliminating the shutdown image sticking of the AMOLED display and improving the display quality of the display device.

Figure 4:
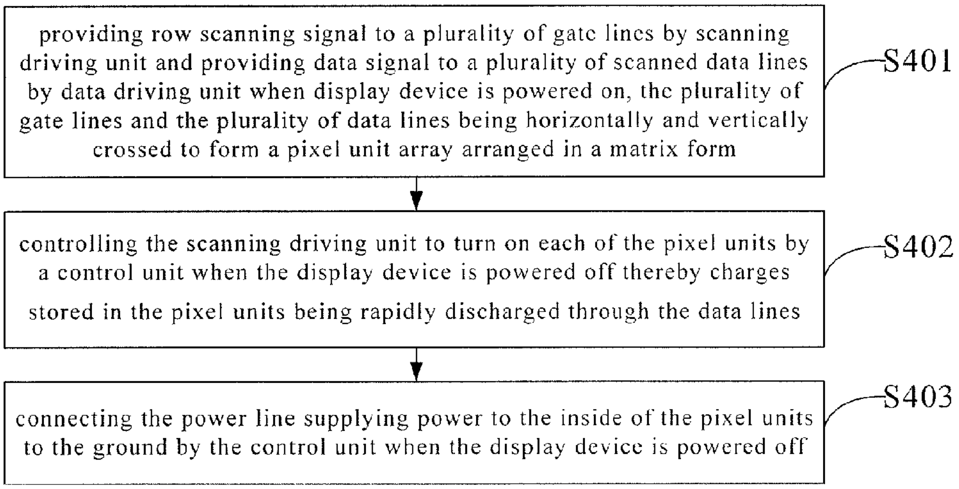
FIG. 4 is a schematic diagram of a flow of a method for driving an array substrate according to an embodiment of the present disclosure.

FIG. 4 is a schematic diagram of a flow of a method for driving an array substrate according to an embodiment of the present disclosure. As shown in FIG. 4, the method for driving the array substrate comprises the following operation processes:

In step S401, when a display device is powered on, a scanning driving unit provides a row scanning signal to a plurality of gate lines and a data driving unit provides a data signal to a plurality of scanned data lines, the plurality of gate lines and the plurality of data lines being horizontally and vertically crossed with each other to form an array of pixel units arranged in a matrix form.

In step S402, when the display device is powered off, a control unit controls the scanning driving unit to turn on each of the pixel units, such that charges stored in the pixel units are rapidly discharged through the data lines.

According to the method for driving the array substrate of the embodiments of the present disclosure, the array substrate adds a control unit on the basis of the existing array substrate design. This control unit is electrically connected with the scanning driving unit and the data driving unit respectively and used for controlling the scanning driving unit to turn on each of the pixel units when the display device is powered off, so that charges stored in the pixel units can be rapidly discharged through the data lines. In this way, image sticking produced due to the existence of charges in the pixels is avoided at the moment after the shutdown of the display device, thereby effectively eliminating the shutdown image sticking of the AMOLED display and improving the display quality of the display device.

Herein, the structure of the array substrate has been described in detail in the previous embodiments, and thus will not be described again herein.

Further, the array substrate can further comprise a power line supplying power to the pixel units. Also referring to FIG. 4, the method further comprises:

in step S403, when the display device is powered off, the control unit connects the power line supplying power to the inside of the pixel units to the ground.

Specifically, in the embodiment of the present disclosure, the display device can adopt various kinds of OLED displays. Since the OLED device is an active device, it is always needed to additionally set a power line VDD for supplying power to the active OLED device. When the display device is powered off, it is generally difficult for this power line VDD to be turned off in time, which will also cause charges existing in the pixel units, thereby producing the shutdown image sticking. The design adopting such kind of control unit 140 can rapidly connect the power line VDD to the ground when the display device is powered off, so as to further avoid the charges from being left in the pixel units and further improve the display quality of the display device.

Those ordinary skilled in the art can understand: all or part of steps for implementing the above method embodiments can be completed by program instruction-related hardware. The above program can be stored in a computer readable storage medium, and the program performs the steps including the above method embodiments when being performed; and the above storage medium includes various media such as ROM, RAM, diskette or optical disk and so on that can store program codes.

The above descriptions are just specific embodiments of the present disclosure, however, the scope sought for protection in the present disclosure is not limited thereto. Various modifications or replacements within the technical scope disclosed in the present disclosure that can be easily conceived by those skilled in the art who are familiar with the technique field should be included within the protection scope of the present disclosure. Therefore, the protection scope of the present disclosure should be subject to the protection scope of the Claims.

What is claimed is:

1. An array substrate comprising:

a scanning driving unit configured to provide a row scanning signal to a plurality of gate lines, and a data driving unit configured to provide a data signal to a plurality of data lines, the plurality of gate lines and the plurality of data lines being horizontally and vertically crossed to form an array of pixel units arranged in a matrix form, wherein the array substrate further comprises:

a control unit directly connected with the scanning driving unit and the data driving unit respectively, and configured to control the scanning driving unit to turn on each of the pixel units when a display device is powered off, such that charges stored in the pixel units are rapidly discharged through the data lines, wherein the control unit comprises: a control signal line for receiving an output signal of a timer, a first transistor and a second transistor;

a gate of the first transistor is connected to the control signal line, a first electrode thereof is connected to the power line, and a second electrode thereof is connected to a ground;

a gate of the second transistor is connected to the control signal line, a first electrode thereof is connected to the data signal line, and a second electrode thereof is connected to a ground.

2. The array substrate according to claim 1, wherein the array substrate further comprises a power line supplying power to the inside of the pixel units; and the control unit is also configured to connect the power line to a ground when the display device is powered off.

3. The array substrate according to claim 2, wherein the pixel units comprise a third transistor, a fourth transistor, a storage capacitor and a light emitting device;

a gate of the third transistor is connected to the gate lines, a first electrode thereof is connected to a gate of the second transistor, and a second electrode thereof is connected to the data lines;

a first electrode of the fourth transistor is connected to a positive electrode of the light emitting device, and a second electrode thereof is connected to the power line;

one terminal of the storage capacitor is connected to the gate of the second transistor, and the other terminal thereof is connected to a negative electrode of the light emitting device; and the negative electrode of the light emitting device is further connected to a common electrode.

4. The array substrate according to claim 2, wherein the scanning driving unit comprises:

a first scanning signal line, a second scanning signal line, a voltage line, two fifth transistors corresponding to the first scanning signal line and the second scanning signal line and a plurality of sixth transistors;

a gate of the fifth transistor is connected to the control unit, a first electrode thereof is connected to the scanning signal line, and a second electrode thereof is connected to the voltage line;

a gate of the sixth transistor is connected to the control unit, a first electrode thereof is connected to one of the gate lines and a second electrode thereof is connected to a scanning signal line;

the first scanning signal line is used to provide line by line a row scanning signal to an odd row of gate lines through the sixth transistor; and the second scanning signal line is used to provide line by line the row scanning signal to an even row of gate lines through the sixth transistor.

5. The array substrate according to claim 2, wherein the data driving unit comprises:

a plurality of data signal lines, a switch signal line and a plurality of seventh transistors corresponding to the data signal lines;

a gate of the seventh transistor is connected to the switch signal line, a first electrode thereof is connected to one of the data lines, and a second electrode thereof is connected to one of the data signal lines; and each of the data signal lines is used to input a data signal of one color.

6. The display device comprising the array substrate according to claim 1.

7. The display device according to claim 6, wherein the array substrate further comprises a power line supplying power to the inside of the pixel units; and the control unit is also configured to connect the power line to a ground when the display device is powered off.

8. The display device according to claim 7, wherein the pixel units comprise a third transistor, a fourth transistor, a storage capacitor and a light emitting device;

a gate of the third transistor is connected to the gate lines, a first electrode thereof is connected to a gate of the second transistor, and a second electrode thereof is connected to the data lines;

a first electrode of the fourth transistor is connected to a positive electrode of the light emitting device, and a second electrode thereof is connected to the power line;

one terminal of the storage capacitor is connected to the gate of the second transistor, and the other terminal thereof is connected to a negative electrode of the light emitting device; and the negative electrode of the light emitting device is further connected to a common electrode.

9. The display device according to claim 7, wherein the scanning driving unit comprises:

a first scanning signal line, a second scanning signal line, a voltage line, two fifth transistors corresponding to the first scanning signal line and the second scanning signal line and a plurality of sixth transistors;

a gate of the fifth transistor is connected to the control unit, a first electrode thereof is connected to the scanning signal line, and a second electrode thereof is connected to the voltage line;

a gate of the sixth transistor is connected to the control unit, a first electrode thereof is connected to one of the gate lines and a second electrode thereof is connected to a scanning signal line;

the first scanning signal line is used to provide line by line a row scanning signal to an odd row of gate lines through the sixth transistor; and the second scanning signal line is used to provide line by line the row scanning signal to an even row of gate lines through the sixth transistor.

10. The display device according to claim 7, wherein the data driving unit comprises:

a plurality of data signal lines, a switch signal line and a plurality of seventh transistors corresponding to the data signal lines;

a gate of the seventh transistor is connected to the switch signal line, a first electrode thereof is connected to one of the data lines, and a second electrode thereof is connected to one of the data signal lines; and each of the data signal lines is used to input a data signal of one color.

11. A method for driving the array substrate according to claim 1, comprising:

providing a row scanning signal to a plurality of gate lines by a scanning driving unit and providing a data signal to a plurality of scanned data lines by a data driving unit when a display device is powered on, the plurality of gate lines and the plurality of data lines being horizontally and vertically crossed to form an array of pixel units arranged in a matrix form; and controlling the scanning driving unit to turn on each of the pixel units by a control unit when the display device is powered off, such that charges stored in the pixel units are rapidly discharged through the data lines.

12. The method according to claim 11, further comprising:

connecting a power line supplying power to the inside of the pixel units to a ground by the control unit when the display device is powered off.

* * * * *